(12) United States Patent
Dulloor et al.

(10) Patent No.: US 10,126,985 B2
(45) Date of Patent: Nov. 13, 2018

(54) APPLICATION DRIVEN HARDWARE CACHE MANAGEMENT

(71) Applicant: Intel Corporation, Santa Clara, CA (US)

(72) Inventors: Subramanya R. Dulloor, Santa Clara, CA (US); Rajesh M. Sankaran, Portland, OR (US); David A. Koufaty, Portland, OR (US); Christopher J. Hughes, Santa Clara, CA (US); Jong Soo Park, Santa Clara, CA (US); Sheng Li, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 546 days.

(21) Appl. No.: 14/748,971

(22) Filed: Jun. 24, 2015

(65) Prior Publication Data
US 2016/0378651 A1    Dec. 29, 2016

(51) Int. Cl.
| | | |
|---|---|---|
| *G06F 12/00* | (2006.01) |
| *G06F 3/06* | (2006.01) |
| *G06F 12/0888* | (2016.01) |
| *G06F 9/50* | (2006.01) |
| *G06F 12/08* | (2016.01) |
| *G06F 12/02* | (2006.01) |
| *G06F 12/1009* | (2016.01) |
| *G06F 12/0866* | (2016.01) |

(52) U.S. Cl.
CPC .......... *G06F 3/0673* (2013.01); *G06F 3/0604* (2013.01); *G06F 3/0638* (2013.01); *G06F 9/50* (2013.01); *G06F 12/0888* (2013.01); *G06F 3/0608* (2013.01); *G06F 3/0665* (2013.01); *G06F 12/023* (2013.01); *G06F 12/08* (2013.01); *G06F 12/0866* (2013.01); *G06F 12/1009* (2013.01); *G06F 2212/60* (2013.01); *G06F 2212/684* (2013.01)

(58) Field of Classification Search
CPC .... G06F 3/0673; G06F 3/0604; G06F 3/0638; G06F 9/50; G06F 12/0888; G06F 2212/60; G06F 3/0608; G06F 3/0665; G06F 12/023; G06F 12/08; G06F 12/0866; G06F 12/1009; G06F 2212/684
USPC ........................................................ 711/118
See application file for complete search history.

(56) References Cited

U.S. PATENT DOCUMENTS 5,906,000 A * 5/1999 Abe ...................... G06F 12/122
                                                           711/133
7,278,008 B1 * 10/2007 Case ................... G06F 12/1036
                                                           710/26

(Continued)

OTHER PUBLICATIONS

"Platform Shared Resource Control: Cache Allocation Technology", Intel Software Developer's Manual (vol. 3B, Chapter 17.15).

(Continued)

*Primary Examiner* — Mardochee Chery
(74) *Attorney, Agent, or Firm* — Lowenstein Sandler LLP

(57) ABSTRACT

A processor includes a processing core to generate a memory request for an application data in an application. The processor also includes a virtual page group memory management (VPGMM) unit coupled to the processing core to specify a caching priority (CP) to the application data for the application. The caching priority identifies importance of the application data in a cache.

16 Claims, 14 Drawing Sheets

(56) References Cited

U.S. PATENT DOCUMENTS

| | | | |
|---|---|---|---|
| 2009/0172315 A1* | 7/2009 | Iyer | G06F 9/5016 |
| | | | 711/158 |
| 2009/0240880 A1* | 9/2009 | Kawaguchi | G06F 3/0617 |
| | | | 711/114 |
| 2012/0017042 A1* | 1/2012 | Matsui | G06F 3/0608 |
| | | | 711/114 |
| 2012/0054438 A1* | 3/2012 | Kawaguchi | G06F 3/0608 |
| | | | 711/118 |
| 2012/0226850 A1* | 9/2012 | Nakanishi | G06F 12/1009 |
| | | | 711/102 |
| 2013/0275680 A1* | 10/2013 | Ikegaya | G06F 3/0608 |
| | | | 711/118 |
| 2013/0339621 A1* | 12/2013 | Steely, Jr. | G06F 12/0891 |
| | | | 711/133 |
| 2016/0110298 A1 | 4/2016 | Koufaty et al. | |

OTHER PUBLICATIONS

"A Case for MLP-Aware Cache Replacement"; Moinuddin K. Qureshi, Daniel N. Lynch, Onur Mutlu, Yale N. Patt; ISCA 2006.

* cited by examiner

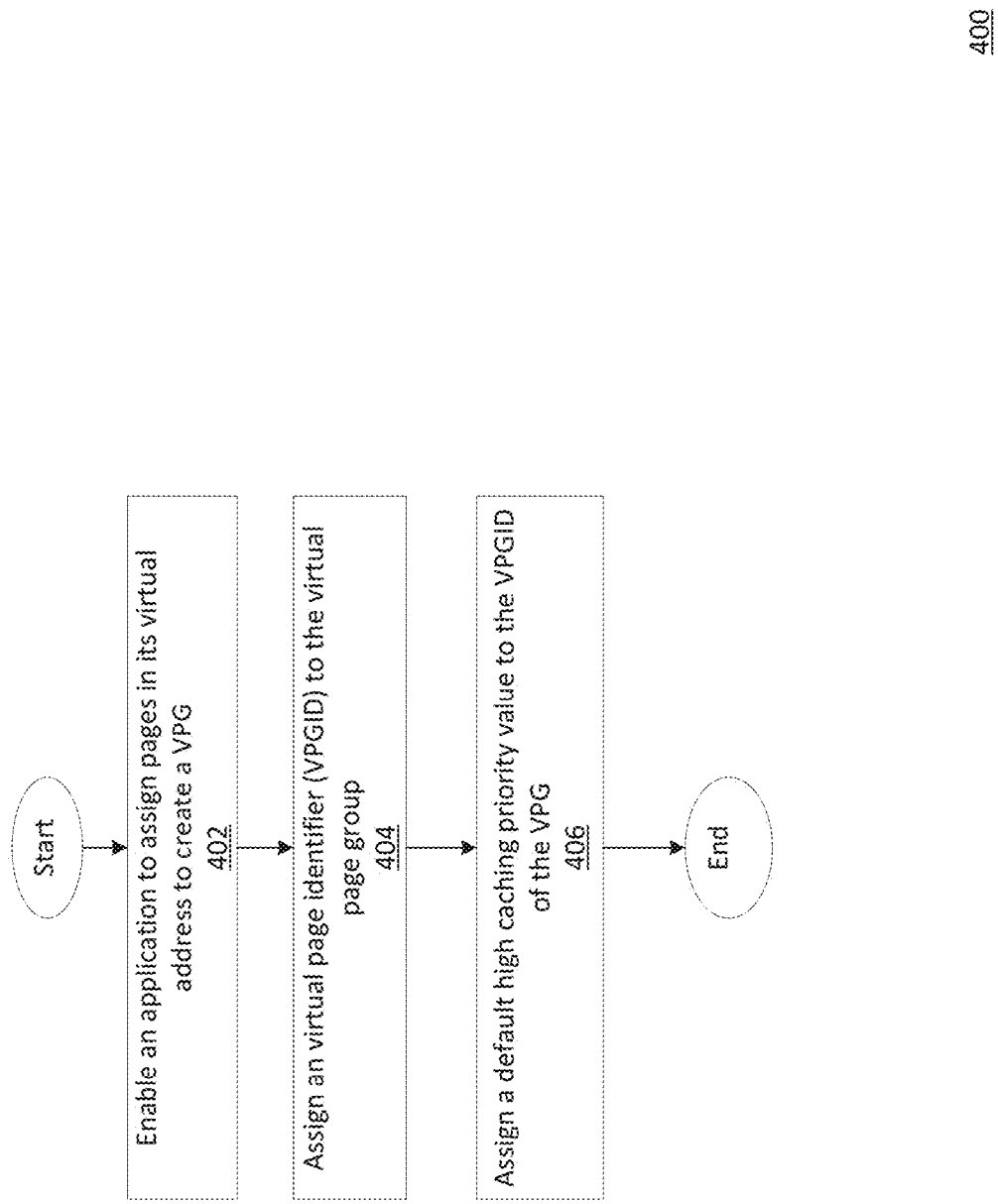

APPLICATION DRIVEN HARDWARE CACHE MANAGEMENT

TECHNICAL FIELD

The embodiments of the disclosure relate generally to processing devices, and, more specifically to application driven hardware cache management.

BACKGROUND

In many central processing units, a software controls over allocations of shared platform resources such as caches. Cache allocation technology (CAT) enables the software to partition the caches between multiple processes and allows cache capacity to be reserved for a process or a group of processes. CAT enables cache resource allocation and performance isolation based on priority of an application.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 4A is a flow diagram of a method defining a group of pages in virtual address space of an application according to an embodiment of the disclosure.

DETAILED DESCRIPTION

A computing device may include one or more processing cores in one or more processors (such as central processing units (CPUs)) for executing instructions and a memory device (such as random-access memory (RAM)) for storing instructions and data associated with executing tasks (including user applications and system applications such as the kernel of an operating system) on the one or more processing cores. Instructions of each application program address the memory using virtual addresses (or linear addresses) of a virtual memory that may be translated into physical addresses of the memory by a memory management unit (MMU) associated with the one or more processors. The task executed on a processing core may be a memory request to access (read or write) memory referenced by the virtual addresses, which may be translated into the physical addresses of the memory by the MMU.

Existing memory and cache systems in the CPU treat all memory requests in an application's address space uniformly, with all normal cacheable data accessed read into the CPU caches. Such existing systems rely on N-way set associative cache designs for cache allocation and rely on generic cache replacement algorithms, such as least recently used (LRU) to determine cache lines to evict. However, these systems are not suited for current in-memory server applications as they do not account for actual importance of the application data to an application for cache allocation and eviction decisions. As such, the applications may not optimally utilize relatively scarce cache resources.

Embodiments of the disclosure overcome the above problems by implementing application-driven hardware cache management that specifies caching priorities (CPs) of application data. In one embodiment, a CP is a value assigned to determine importance of data in the cache. The CP value may be modified based on a type of application data in the application. In one embodiment, the CP value is modified based on requirements of the application. The CPs can function as hints to the CPU caching systems. In some embodiments, CPs are used to determine cache line evictions. The cache eviction algorithms may use the CPs in addition to LRU information in their cache replacement algorithms. In other embodiments, the CPs are used to determine cache allocation. In one embodiment, the CPs are used to restrict number of ways in an N-way set associate cache available for the data.

Figure 1:
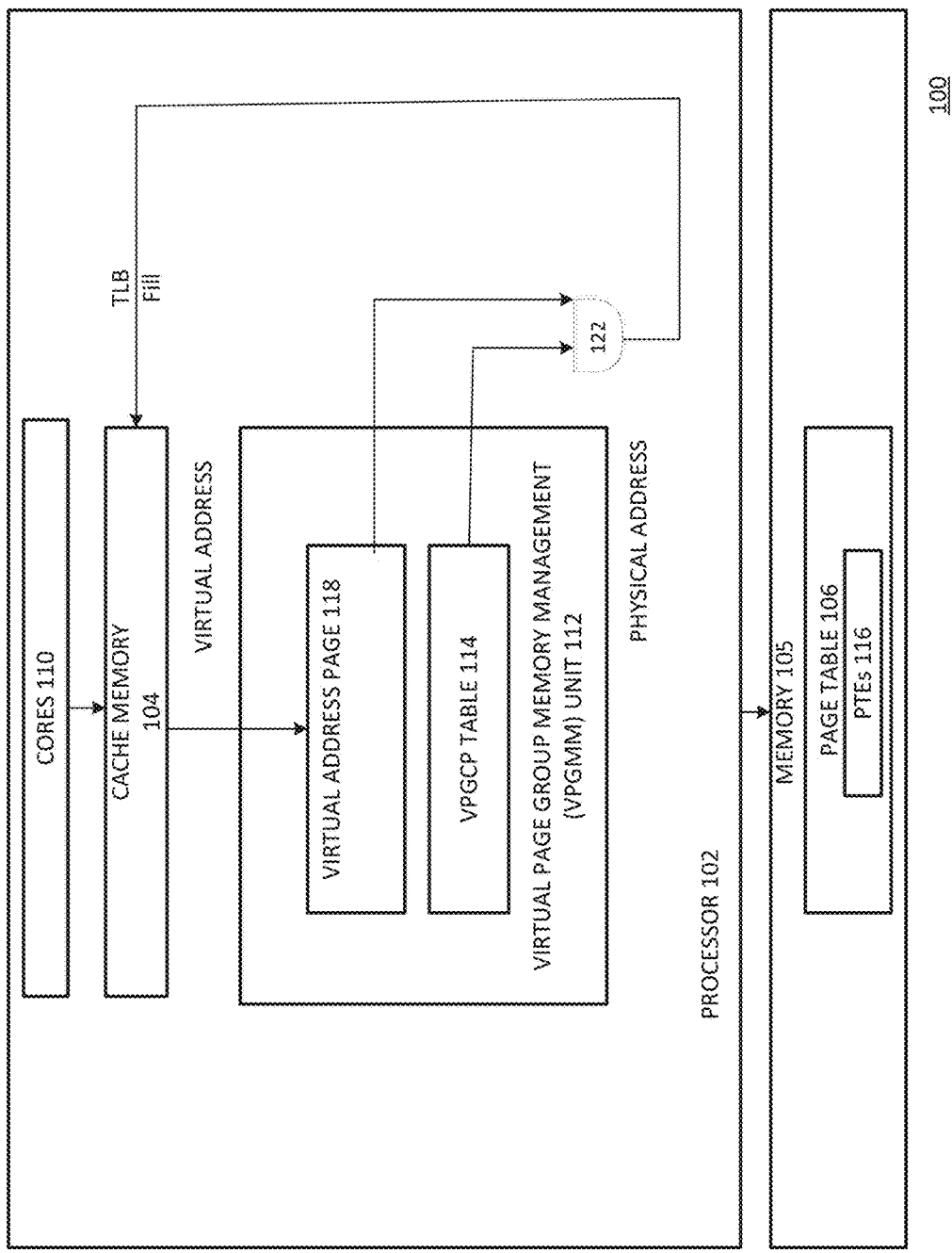
FIG. 1 illustrates a processing system according an embodiment of the disclosure.

FIG. 1 illustrates a processing system 100 including a processing device coupled to a memory 105 to protect the memory according to an embodiment of the disclosure. The processing device 102 (such as a central processing unit (CPU) may include a virtual page group memory management (VPGMM) unit 112 connected to memory hardware, such as cache memory 104 having cache units. The cache units may include a hierarchy of cache levels stored on the processor 102 and off of the processor. A fastest Level 1 (L1) cache may be included as memory 104 on the processor 102. The cache memory 104 may store data associated with system application and user application programs executed by the processor 102. Additional lower-level caches (e.g., L2, 3, etc.) may be located both on and off of the processing device 102.

In one embodiment, the processor 102 may further include one or more processing cores 110. The one or more processing cores are the engines within the processor 102 for executing tasks, such as the system applications and the user application programs. In one embodiment, the tasks executed on processing cores 110 access a virtual memory through virtual addresses (also known as linear addresses). The VPGMM unit 112 may map the virtual addresses of the virtual memory to the physical addresses of the memory (a.k.a. "off chip memory") 105. The space of virtual addresses may be divided into fixed sized units called pages. A page of the virtual addresses may be mapped correspondingly into fixed-sized units in the space of the physical addresses of the cache memory 104 called memory frames.

In one embodiment, the VPGMM unit 112 may include one or more virtual addresses pages or page numbers 118 corresponding to a page table 106 having one or more page table entries (PTEs) 116 stored in the memory 105. The page table entries are also known as leaf nodes of the page table 106. In one embodiment, VPGMM unit 112 may perform the memory address mapping. Each of the PTEs 116 may store one or more memory frame numbers that are identified according to the virtual address page numbers 118. In one embodiment, a task executing on the processing cores 110 may allocate a block of memory by specifying one or more virtual address ranges. A virtual address may include a first portion including one or more bits (e.g., the high-order twenty bits) indicating the virtual address page number and a second portion of bits (e.g., the lower-order 12 bits) indicating the byte offset within a memory frame corresponding to the page. The PTE 116 stores mappings between pages of virtual addresses to physical addresses. The mappings may be the mapping between identifiers of pages (or page numbers) to identifiers of memory frames (or memory frame numbers). The memory frame numbers determine the region of the cache memory 104 allocated to a task. In one embodiment, these mappings are part of a page table.

The VPGMM 112 may use the virtual address page number 118 to identify a memory frame number stored in the PTE 116, and combine the identified memory frame number 118 and the offset byte to form a physical address, corresponding to the PTEs 116 stored in the page table 106 in the memory 105. The physical address corresponding to the virtual address may be stored in a buffer.

In one embodiment, the VPGMM unit 112 enables applications to assign the pages 118 in its virtual addresses to a virtual page group (VPG). The VPGMM unit 112 assigns an identification denoted by VPGID to the VPG. The VPGMM unit 112 may add a set of pages in an application's virtual address to an existing VPG denoted by the VPGID. The VPGMM unit 112 may delete a set of pages in the application's virtual address from an already-existing VPG denoted by the VPG ID. The VPGMM unit 112 may delete the VPG denoted by the VPGID. In one embodiment, the VPGID is stored in the PTE 116. In one embodiment, the VPGID is associated with the virtual address stored in the PTE 116. As such, the VPGID is assigned to each of the PTEs in the virtual address.

In one embodiment, the VPGMM 112 may include a virtual page group caching priority (VPGCP) table 114. In one embodiment, the VPGCP table 114 includes a caching priority (CP) specifically assigned to the VPG in the application's virtual address stored in the PTE 116. As such, the VPGCP table 114 represents the CP corresponding to the VPGID (stored in the virtual address age 118) of the VPG. In one embodiment, a CP is a value assigned to determine importance of caching data in the cache memory 104. In one embodiment, the CP is a priority assigned to application data of an application. In one embodiment, the CP is assigned based on requirements of the application data. Some of the requirements of the application may include, but are not limited to application's ability to classify application data based on relative importance and ability to convey the information to the system software managing VPGCP table. In one embodiment, the CP is assigned based on a type of the application data. Some examples of types of data may include, but are not limited to, index data and table data in a database.

In one embodiment, the VPGMM unit 112 may include logics that enable CPs for the application data and define the VPG in the application's address space to which a specific CP is applied as described in greater detail with respect to FIG. 2 and FIG. 3 below. In one embodiment, the VPGMM unit 112 enables applications to directly modify CP value assigned to a VPG in the VPGCP table 114. In one embodiment, the modified CP for the application is applied for the application data in the cache. In one embodiment, the modified CP is used to determine cache allocation. In one embodiment, the modified CP is used to make cache eviction decisions. In one embodiment, the VPGMM unit assigns a default value of 0 (i.e. highest priority) to each of the CPs assigned to the VPG in the VPGCP table 114. In one embodiment, the VPGMM unit modifies the default value of the CP assigned to the VPG in the VPGCP table 114.

In one embodiment, the VPGMM unit 112 may include an AND logic 122 including a first input received from the PTE 116 and a second input received from the VPGCP table 114. The first input is the translation of the virtual address to physical address. The second input is the CP assigned to the virtual address of the VPG that the PTE is assigned to. The AND logic 122 may combine the CP received from the VPGCP table 114 with the virtual to physical address translation received from the PTE 116 to populate the translation look-aside buffers (TLBs) into the cache memory 104. In one embodiment, the TLB functions to address or look up data in the cache memory 104 for faster retrieval.

In one embodiment, in response to a request by a task executing on the cores 110 to access memory frames whose identifiers are stored in the PTE 116, the VPGMM unit 112 may enable to specify CPs in its virtual space in order to provide importance of caching some application data over others.

Figure 2:
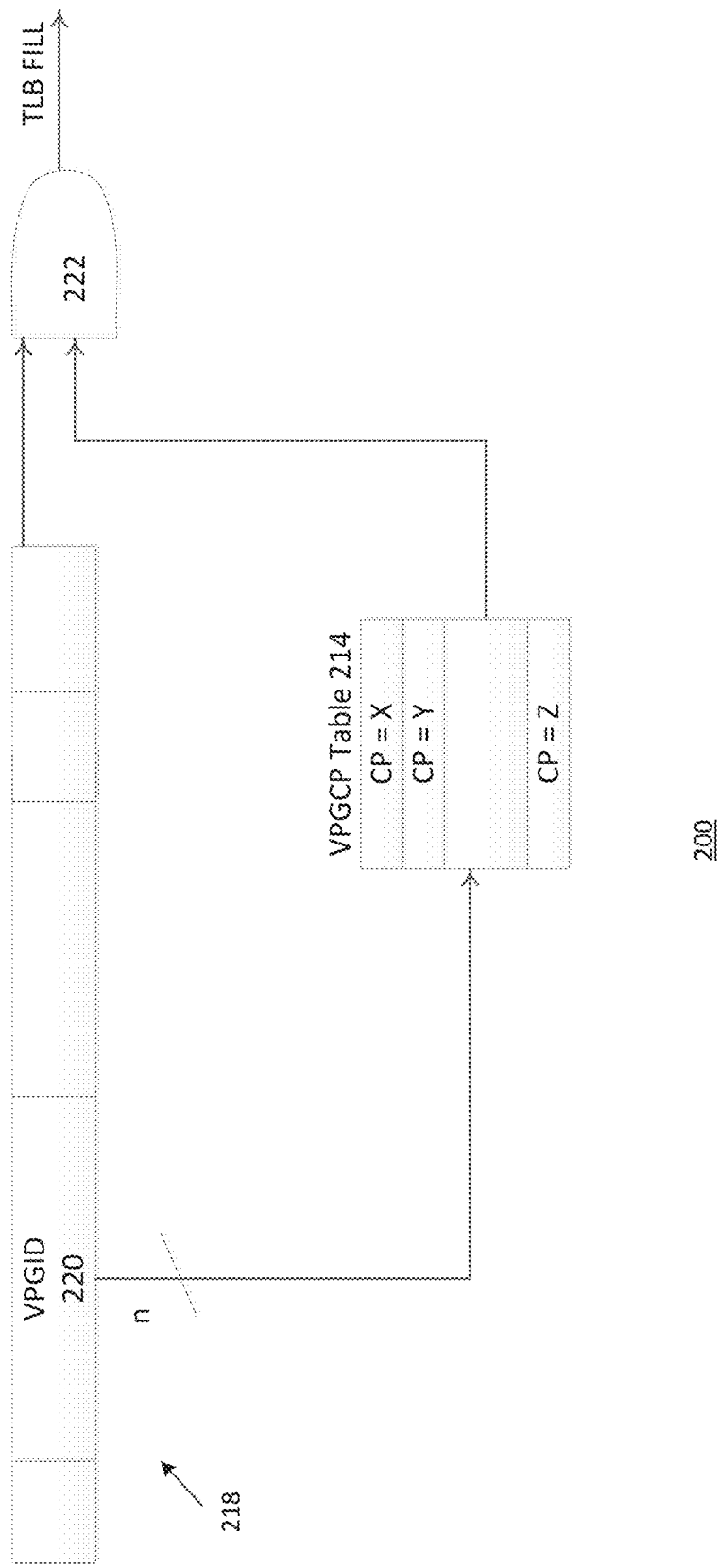
FIG. 2 illustrates an overview of architecture of a virtual page group memory management unit according to an embodiment of the disclosure.

FIG. 2 illustrates an overview of architecture of a VPGMM unit 200 according to an embodiment of the disclosure. In one embodiment, the VPGMM unit 200 is same as the VPGMM 112 of FIG. 1. As shown in FIG. 2, the VPGMM unit 200 may include a virtual address page 218 corresponding to the page table (not shown). The virtual address page 218 is same as the virtual address page 118 of FIG. 1. As discussed above, the PTE 216 contains mapping of a page in an application's virtual address (VA) space to an actual physical address (PA). In one embodiment, each page 218 in the application's virtual memory may be assigned to a single VPG, which is denoted by a VPGID 220. Each of the VPG is assigned a CP and each of the pages in the VPG are assigned to the same CP. The CP is stored in a VPGCP table 214. The VPGCP table 214 is same as the VPGCP table of FIG. 1. As shown, the VPGID 220 indexes the VPGCP table 214 that contains the CP assigned to the VPG. In one example, the CP is assigned a value in a number in the range of 0 to Max_CP. In one embodiment, higher number values in the range imply a lower caching priority and a higher preference for eviction from the caches. In another embodiment, the lower number values such as 0 in the range imply a higher caching priority with a lower preference for eviction from the caches.

In one embodiment, the CP is specified for a virtual page group (VPG). The CP may be mapped to a virtual address. As such, each of the VPGs denoted by their corresponding VPGIDs 220 in the VPGCP table 114 is assigned with a CP. In one embodiment, the CP assigned to the VPGID of the VPG is updated by changing entries directly in the VPGCP table 214. In one embodiment, by default each of the VPGIDs of the VPGs is assigned with a value of CP to be 0 (i.e. highest priority). In one embodiment, the value of the CP assigned to the VPGID of the VPG is modified by lowering the value of the CP for the VPG in the VPGCP table 214.

In one embodiment, the VPGMM unit 200 may include an AND logic 222 including a first input received from the virtual address page 218, and a second input received from the VPGCP table 214. The first input is the translation of the virtual address of the VPG to physical address and the second input is the CP assigned to the VPG that the virtual address belongs to. The output of the AND logic 222 may provide for a TLB fill into the cache memory.

Figure 3:
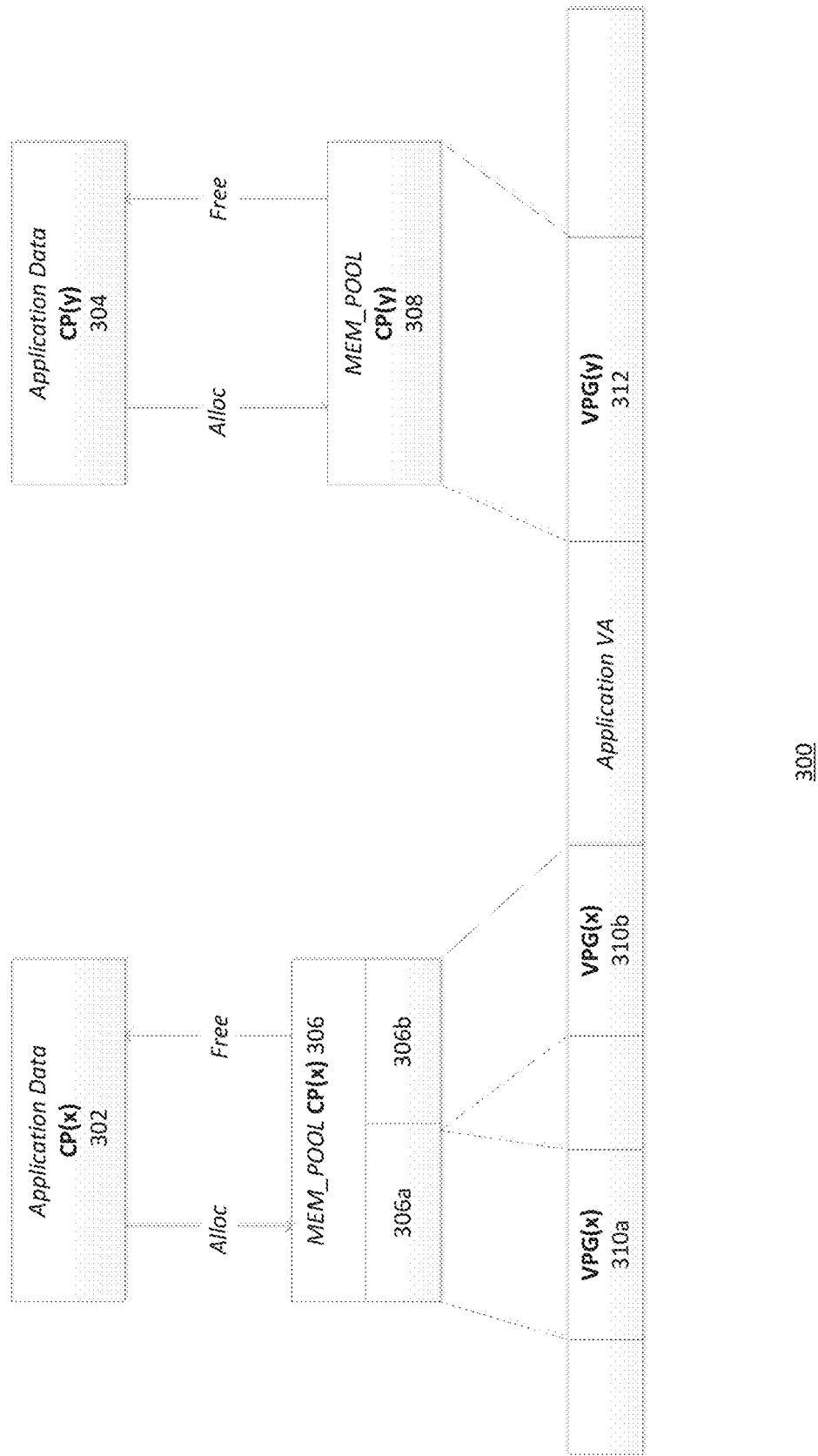
FIG. 3 is an overview of a software flow to enable caching priorities for application data according to an embodiment of the disclosure.

FIG. 3 illustrates an overview of a flow 300 to enable caching priorities for application data. In one embodiment, each of application data 302 and 304 is assigned to a priority CP (x) and CP (y) respectively. In one embodiment, each application data 302 and 304 corresponds to a memory pool 306 and 308 respectively. In one embodiment, each of the memory pools 306 and 308 is a buffer defining a range of memory to allocate the application data 302 and 304 respectively. In one embodiment, each memory pool 306 and 308 is assigned to at least one VPG 310 and 312 respectively. In one embodiment, the application data 302 and 304 from each of the memory pools 306 and 308 is allocated to corresponding VPG 310 and 312. In one embodiment, based on requirements of the application, each of the application data 302 and 304, the corresponding VPG 310 and 312 is assigned a CP. Some of the requirements of the application may include, but are not limited to application's ability to classify application data based on relative importance and ability to convey the information to the system software managing VPGCP table. In one embodiment, based on the type of the application data, each of the application data 302 and 304, the corresponding VPG 310 and 312 is assigned a CP. Some of the type of the data may include, hut is not limited to, index data and table data in a database.

In one embodiment, the application data 302 includes index data and table data. In one embodiment, the memory pool 306 includes two memory pools 306a and 306b for the index data and for the table data, respectively, and are assigned to two VPGs 310a and 310b, respectively. As such, the index data from the memory pool 306a is allocated to the VPG 310a and the table data from the memory pool 306b is allocated to the VPG 310b. In one embodiment, the VPG 310a with index data is assigned a higher CP. In such embodiment, value of the CP would be 0 or close to 0. In one embodiment, the VPG 310b with the table data is assigned a lower CP. In this embodiment, the CP would be greater than 0.

FIG. 4A is a flow diagram of method 400 of defining a group of pages in virtual address space of an application. Method 400 may be performed by processing logic that may include hardware (e.g., circuitry, dedicated logic, programmable logic, microcode, etc.), software (such as instructions run on a processing device, a general purpose computer system, or a dedicated machine), firmware, or a combination thereof. In one embodiment, method 400 may be performed, in part, by the VPGMM unit 112 of the processor 102 as shown in FIG. 1.

For simplicity of explanation, the method 400 is depicted and described as a series of acts. However, acts in accordance with this disclosure can occur in various orders and/or concurrently and with other acts not presented and described herein. Furthermore, not all illustrated acts may be performed to implement the method 400 in accordance with the disclosed subject matter. In addition, those skilled in the art will understand and appreciate that the method 400 could alternatively be represented as a series of interrelated states via a state diagram or events.

Method 400 begins at block 402 where an application is enabled to assign pages in its virtual addresses to create a VPG. In one embodiment, a set of pages may be added to the VPG. In one embodiment, a set of pages may be deleted from the VPG. At block 404, a virtual page group identifier (VPGID) identifying the VPG is assigned to the VPG. At block 406, a default high caching priority (CP) value is assigned to the VPGID of the VPG. As discussed above, the value assigned to the CP determines importance of data in the cache. Also, as discussed above, a value 0 is assigned as the high CP.

Figure 4B:
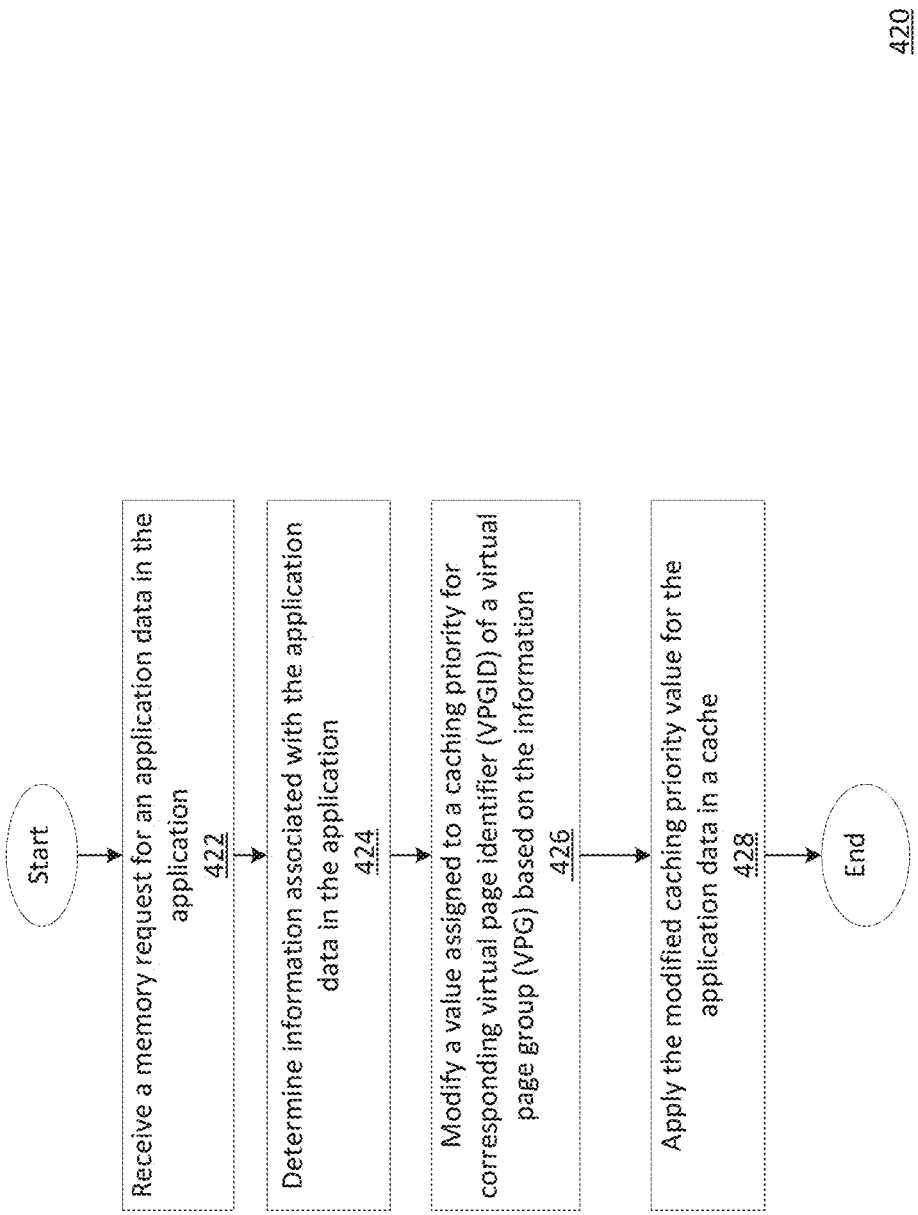
FIG. 4B is a flow diagram of a method specifying caching priorities to application data according to an embodiment

FIG. 4B is a flow diagram of method 420 of specifying caching priorities of application data. Method 420 may be performed by processing logic that may include hardware (e.g., circuitry, dedicated logic, programmable logic, microcode, etc.), software (such as instructions run on a processing device, a general purpose computer system, or a dedicated machine), firmware, or a combination thereof. In one embodiment, method 420 may be performed, in part, by the VPGMM unit 112 of the processor 102 as shown in FIG. 1.

For simplicity of explanation, the method 420 is depicted and described as a series of acts. However, acts in accordance with this disclosure can occur in various orders and/or concurrently and with other acts not presented and described herein. Furthermore, not all illustrated acts may be performed to implement the method 420 in accordance with the disclosed subject matter. In addition, those skilled in the art will understand and appreciate that the method 420 could alternatively be represented as a series of interrelated states via a state diagram or events.

Method 420 begins at block 422 where a memory request for application data in an application is received by the processing logic. At block 424, information associated with the application data of the application is determined. In one embodiment, the information includes requirements of the application. In one embodiment, the information includes type of application data. As discussed above, requirements of the application may include, but are not limited to application's ability to classify application data based on relative importance and ability to convey this information to the system software managing VPGCP table. Also, as discussed above, some of the type of the data may include, but is not limited to, index data and table data in the database.

At block 426, a value assigned to a caching priority (CP) is modified for a corresponding VPGID of the VPG based on the information. As discussed above, a value is assigned to the CP to determine importance of data in the cache. In one example, CP is a given a numerical value in the range of 0 to Max_CP where large numbers in the range imply lower caching priority and higher preference for eviction from the caches and lower numbers in the range imply higher caching priority and lower preference for eviction from the caches. Also as discussed above a default value of 0 indicating the high caching priority (CP) is initially assigned to the VPG. In one embodiment, the CP value for the corresponding VPG is modified in the VPGCP table 214. At block 428, the modified CP value applied for the application data in a cache. In one embodiment, the modified CP value is applied for cache allocation. In one embodiment, the modified CP value is applied for cache eviction.

Figure 5A:
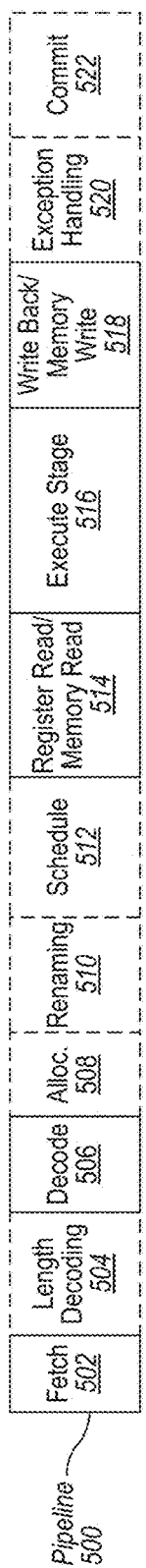
FIG. 5A is a block diagram illustrating a micro-architecture for a processor in which one embodiment of the disclosure may be used.

FIG. 5A is a block diagram illustrating an in-order pipeline and a register renaming stage, out-of-order issue/execution pipeline implemented by processing device 500 according to some embodiments of the disclosure. The solid lined boxes in FIG. 5A illustrate an in-order pipeline, while the dashed lined boxes illustrates a register renaming, out-of-order issue/execution pipeline. In FIG. 5A, a processor pipeline 500 includes a fetch stage 502, a length decode stage 504, a decode stage 506, an allocation stage 508, a renaming stage 510, a scheduling (also known as a dispatch or issue) stage 512, a register read/memory read stage 514, an execute stage 516, a write back/memory write stage 518, an exception handling stage 522, and a commit stage 524. In some embodiments, the ordering of stages 502-524 may be different than illustrated and are not limited to the specific ordering shown in FIG. 5A.

Figure 5B:
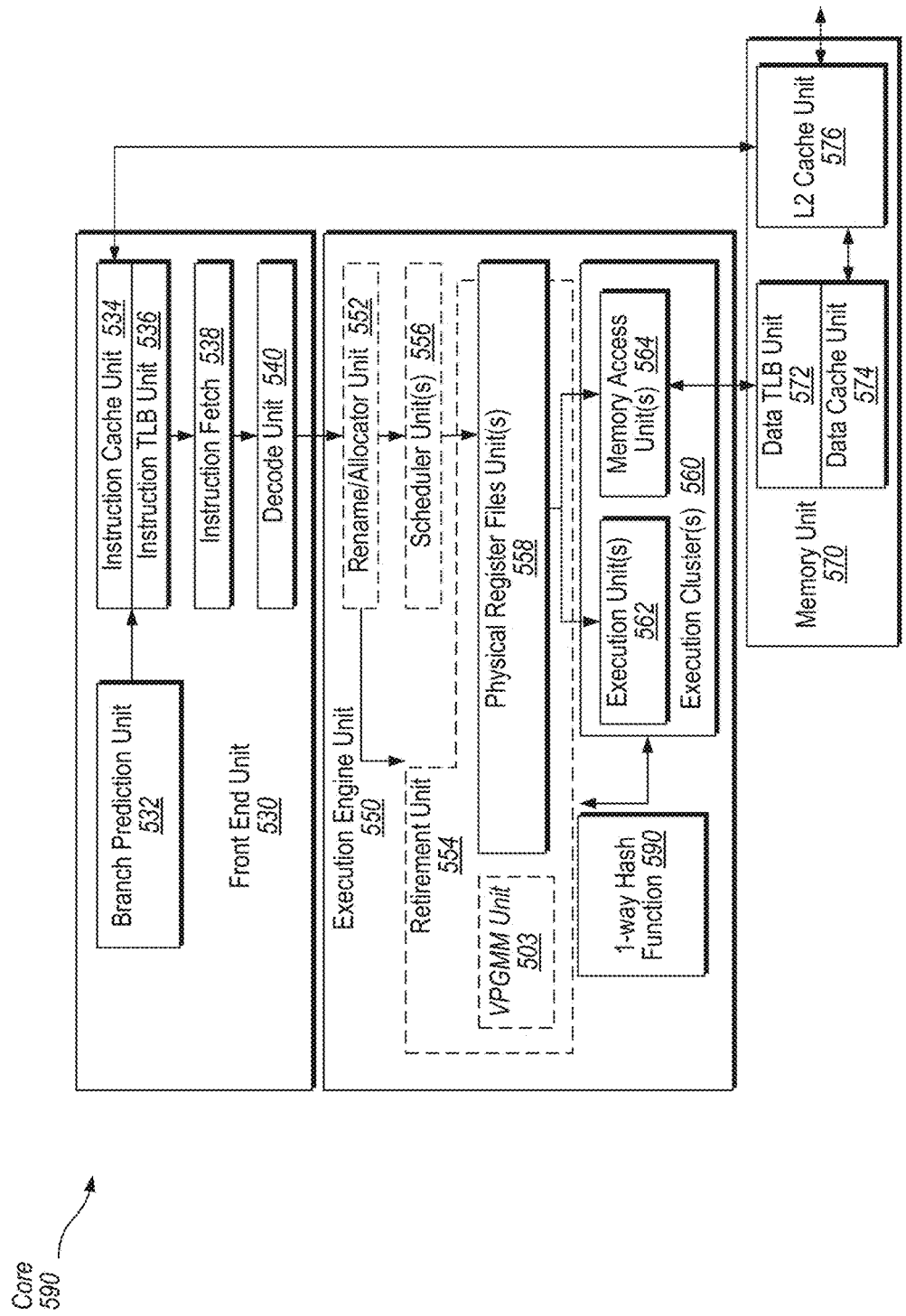
FIG. 5B is a block diagram illustrating an in-order pipeline and a register renaming stage, out-of-order issue/execution pipeline implemented according to at least one embodiment of the disclosure.

FIG. 5B is a block diagram illustrating a micro-architecture for a processor 500 that implements the processing device including heterogeneous cores in accordance with one embodiment of the disclosure. Specifically, processor 500 depicts an in-order architecture core and a register renaming logic, out-of-order issue/execution logic to be included in a processor according to at least one embodiment of the disclosure.

Processor 500 includes a front end unit 530 coupled to an execution engine unit 550, and both are coupled to a memory unit 570. The processor 500 may include a reduced instruction set computing (RISC) core, a complex instruction set computing (CISC) core, a very long instruction word (VLIW) core, or a hybrid or alternative core type. As yet another option, processor 500 may include a special-purpose core, such as, for example, a network or communication core, compression engine, graphics core, or the like. In one embodiment, processor 500 may be a multi-core processor or may part of a multi-processor system.

The front end unit 530 includes a branch prediction unit 532 coupled to an instruction cache unit 534, which is coupled to an instruction translation lookaside buffer (TLB) 536, which is coupled to an instruction fetch unit 538, which is coupled to a decode unit 540. The decode unit 540 (also known as a decoder) may decode instructions, and generate as an output one or more micro-operations, micro-code entry points, microinstructions, other instructions, or other control signals, which are decoded from, or which otherwise reflect, or are derived from, the original instructions. The decoder 540 may be implemented using various different mechanisms. Examples of suitable mechanisms include, but are not limited to, look-up tables, hardware implementations, programmable logic arrays (PLAs), microcode read only memories (ROMs), etc. The instruction cache unit 534 is further coupled to the memory unit 570. The decode unit 540 is coupled to a rename/allocator unit 552 in the execution engine unit 550.

The execution engine unit 550 includes the rename/allocator unit 552 coupled to a retirement unit 554 and a set of one or more scheduler unit(s) 556. The retirement unit 554 may include a virtual page group memory management (VPGMM) unit 503 minimize snoop traffic both locally and across cores on a chip multi-core fabric according to embodiments of the invention. The scheduler unit(s) 556 represents any number of different schedulers, including reservations stations (RS), central instruction window, etc. The scheduler unit(s) 556 is coupled to the physical register file(s) unit(s) 558. Each of the physical register file(s) units 558 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 558 is overlapped by the retirement unit 554 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.).

In one implementation, processor 500 may be the same as processor 102 described with respect to FIG. 1.

Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 554 and the physical register file(s) unit(s) 558 are coupled to the execution cluster(s) 560. The execution cluster(s) 560 includes a set of one or more execution units 562 and a set of one or more memory access units 564. The execution units 562 may perform various operations (e.g., shifts, addition, subtraction, multiplication) and operate on various types of data (e.g., scalar floating point, packed integer, packed floating point, vector integer, vector floating point).

While some embodiments may include a number of execution units dedicated to specific functions or sets of functions, other embodiments may include only one execution unit or multiple execution units that all perform all functions. The scheduler unit(s) 556, physical register file(s) unit(s) 558, and execution cluster(s) 560 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 564). It should also be understood that where separate pipelines are used, one or more of these pipelines may be out-of-order issue/execution and the rest in-order.

The set of memory access units 564 is coupled to the memory unit 570, which may include a data prefetcher 580, a data TLB unit 572, a data cache unit (DCU) 574, and a level 2 (L2) cache unit 576, to name a few examples. In some embodiments DCU 574 is also known as a first level data cache (L1 cache). The DCU 574 may handle multiple outstanding cache misses and continue to service incoming stores and loads. It also supports maintaining cache coherency. The data TLB unit 572 is a cache used to improve virtual address translation speed by mapping virtual and physical address spaces. In one exemplary embodiment, the memory access units 564 may include a load unit, a store address unit, and a store data unit, each of which is coupled to the data TLB unit 572 in the memory unit 570. The L2 cache unit 576 may be coupled to one or more other levels of cache and eventually to a main memory.

In one embodiment, the data prefetcher 580 speculatively loads/prefetches data to the DCU 574 by automatically predicting which data a program is about to consume. Prefeteching may refer to transferring data stored in one memory location of a memory hierarchy (e.g., lower level caches or memory) to a higher-level memory location that is closer (e.g., yields lower access latency) to the processor before the data is actually demanded by the processor. More specifically, prefetching may refer to the early retrieval of data from one of the lower level caches/memory to a data cache and/or prefetch buffer before the processor issues a demand for the specific data being returned.

The processor 500 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.).

It should be understood that the core may support multi-threading (executing two or more parallel sets of operations or threads), and may do so in a variety of ways including time sliced multithreading, simultaneous multithreading (where a single physical core provides a logical core for each of the threads that physical core is simultaneously multi-threading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes a separate instruction and data cache units and a shared L2 cache unit, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 6:
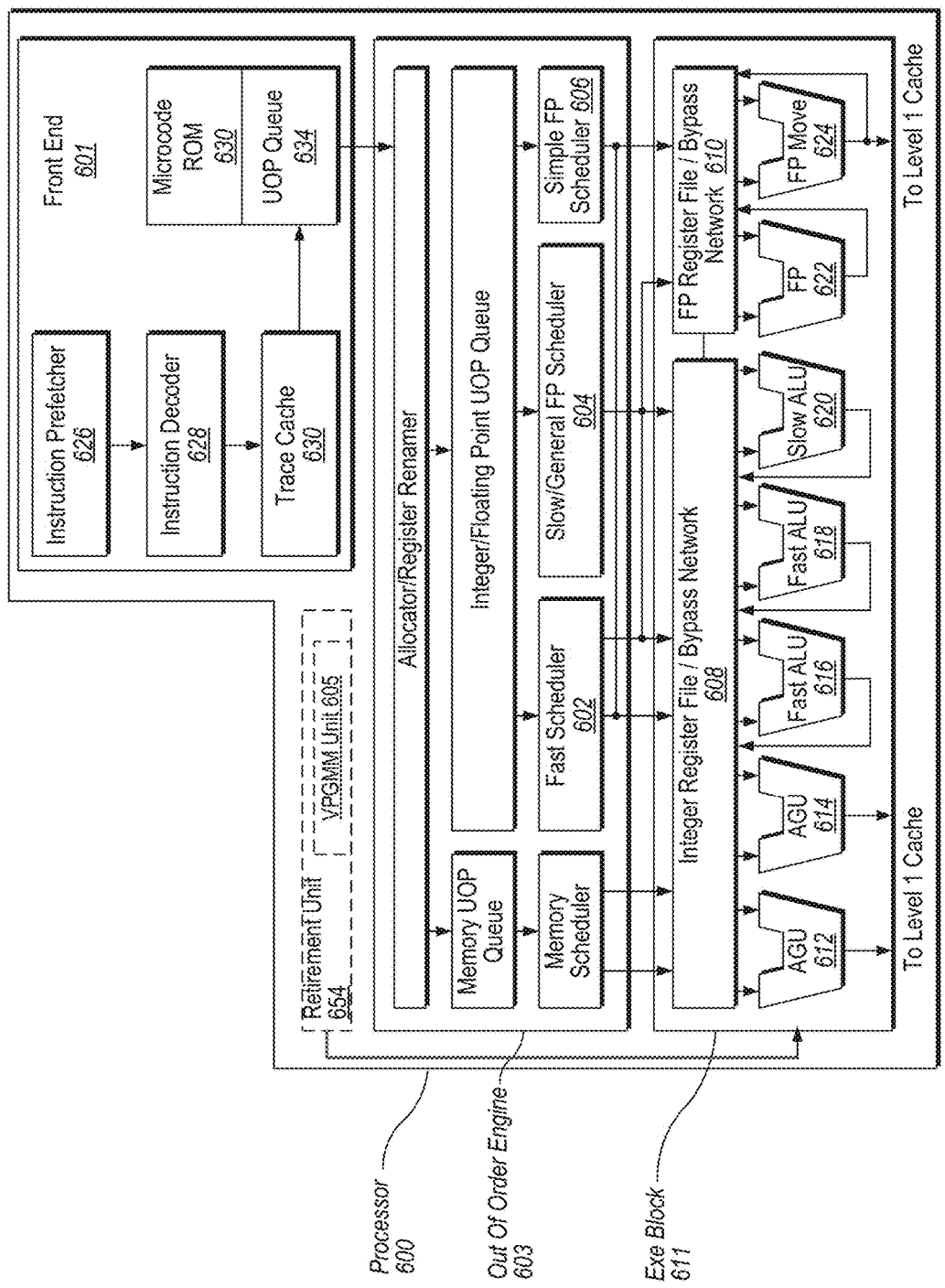
FIG. 6 illustrates a block diagram of the micro-architecture for a processor in accordance with one embodiment of the disclosure.

FIG. 6 illustrates a block diagram of the micro-architecture for a processor 600 that includes hybrid cores in accordance with one embodiment of the disclosure. In some embodiments, an instruction in accordance with one embodiment can be implemented to operate on data elements having sizes of byte, word, doubleword, quadword, etc., as well as datatypes, such as single and double precision integer and floating point datatypes. In one embodiment the in-order front end 601 is the part of the processor 600 that fetches instructions to be executed and prepares them to be used later in the processor pipeline.

The front end 601 may include several units. In one embodiment, the instruction prefetcher 626 fetches instructions from memory and feeds them to an instruction decoder 628 which in turn decodes or interprets them. For example, in one embodiment, the decoder decodes a received instruction into one or more operations called "micro-instructions" or "micro-operations" (also called micro op or uops) that the machine can execute. In other embodiments, the decoder parses the instruction into an opcode and corresponding data and control fields that are used by the micro-architecture to perform operations in accordance with one embodiment. In one embodiment, the trace cache 630 takes decoded uops and assembles them into program ordered sequences or traces in the uop queue 634 for execution. When the trace cache 630 encounters a complex instruction, the microcode ROM 632 provides the uops needed to complete the operation.

Some instructions are converted into a single micro-op, whereas others need several micro-ops to complete the full operation. In one embodiment, if more than four micro-ops are needed to complete an instruction, the decoder 628 accesses the microcode ROM 632 to do the instruction. For one embodiment, an instruction can be decoded into a small number of micro ops for processing at the instruction decoder 628. In another embodiment, an instruction can be stored within the microcode ROM 632 should a number of micro-ops be needed to accomplish the operation. The trace cache 630 refers to an entry point programmable logic array (PLA) to determine a correct micro-instruction pointer for reading the micro-code sequences to complete one or more instructions in accordance with one embodiment from the micro-code ROM 632. After the microcode ROM 632 finishes sequencing micro-ops for an instruction, the front end 601 of the machine resumes fetching micro-ops from the trace cache 630.

The out-of-order execution engine 603 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 602, slow/general floating point scheduler 604, and simple floating point scheduler 606. The uop schedulers 602, 604, 606, determine when a uop is ready to execute based on the readiness of their dependent input register operand sources and the availability of the execution resources the uops need to complete their operation. The fast scheduler 602 of one embodiment can schedule on each half of the main clock cycle while the other schedulers can only schedule once per main processor clock cycle. The schedulers arbitrate for the dispatch ports to schedule uops for execution.

Register files 608, 610, sit between the schedulers 602, 604, 606, and the execution units 612, 614, 616, 618, 620, 622, 624 in the execution block 611. There is a separate register file 608, 610, for integer and floating point operations, respectively. Each register file 608, 610, of one embodiment also includes a bypass network that can bypass or forward just completed results that have not yet been written into the register file to new dependent uops. The integer register file 608 and the floating point register file 610 are also capable of communicating data with the other. For one embodiment, the integer register file 608 is split into two separate register files, one register file for the low order 32 bits of data and a second register file for the high order 32 bits of data. The floating point register file 610 of one embodiment has 128 bit wide entries because floating point instructions typically have operands from 64 to 128 bits in width.

The execution block 611 contains the execution units 612, 614, 616, 618, 620, 622, 624, where the instructions are actually executed. This section includes the register files 608, 610, that store the integer and floating point data operand values that the micro-instructions need to execute. The processor 600 of one embodiment is comprised of a number of execution units: address generation unit (AGU) 612, AGU 614, fast ALU 616, fast ALU 618, slow ALU 620, floating point ALU 622, floating point move unit 624. For one embodiment, the floating point execution blocks 622, 624, execute floating point, MMX, SIMD, and SSE, or other operations. The floating point ALU 622 of one embodiment includes a 64 bit by 64 bit floating point divider to execute divide, square root, and remainder micro-ops. For embodiments of the present disclosure, instructions involving a floating point value may be handled with the floating point hardware.

In one embodiment, the ALU operations go to the high-speed ALU execution units 616, 618. The fast ALUs 616, 618, of one embodiment can execute fast operations with an effective latency of half a clock cycle. For one embodiment, most complex integer operations go to the slow ALU 620 as the slow ALU 620 includes integer execution hardware for long latency type of operations, such as a multiplier, shifts, flag logic, and branch processing. Memory load/store operations are executed by the AGUs 612, 614. For one embodiment, the integer ALUs 616, 618, 620, are described in the context of performing integer operations on 64 bit data operands. In alternative embodiments, the ALUs 616, 618, 620, can be implemented to support a variety of data bits including 16, 32, 128, 256, etc. Similarly, the floating point units 622, 624, can be implemented to support a range of operands having bits of various widths. For one embodiment, the floating point units 622, 624, can operate on 128 bits wide packed data operands in conjunction with SIMD and multimedia instructions.

In one embodiment, the uops schedulers 602, 604, 606, dispatch dependent operations before the parent load has finished executing. As uops are speculatively scheduled and executed in processor 600, the processor 600 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one embodiment of a processor are also designed to catch instruction sequences for text string comparison operations.

The processor 600 also includes logic to implement store address prediction for memory disambiguation according to embodiments of the disclosure. In one embodiment, the execution block 611 of processor 600 may include a store address predictor (not shown) for implementing store address prediction for memory disambiguation.

The processor 600 may include a retirement unit 654 coupled to the execution block 611. The retirement unit 654 may include a virtual page group memory management (VPGMM) unit 605 to minimize snoop traffic both locally and across cores on a chip multi-core fabric according to embodiments of the invention.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data. A register file of one embodiment also contains eight multimedia SIMD registers for packed data.

For the discussions below, the registers are understood to be data registers designed to hold packed data, such as 64 bits wide MMX™ registers (also referred to as 'mm' registers in some instances) in microprocessors enabled with MMX technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one embodiment, in storing packed data and integer data, the registers do not need to differentiate between the two data types. In one embodiment, integer and floating point are either contained in the same register file or different register files. Furthermore, in one embodiment, floating point and integer data may be stored in different registers or the same registers.

Figure 7:
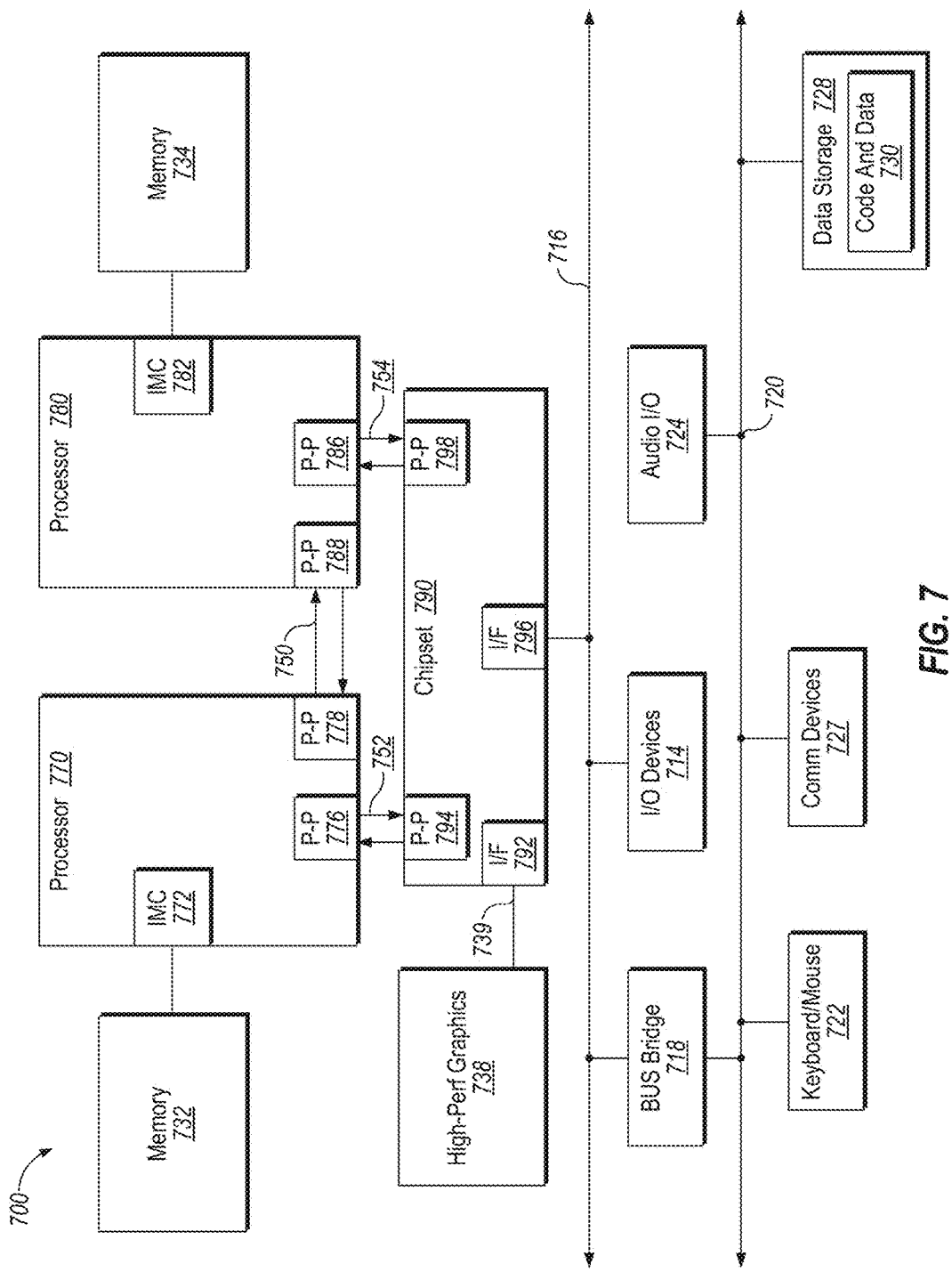
FIG. 7 is a block diagram illustrating a system in which an embodiment of the disclosure may be used.

Referring now to FIG. 7, shown is a block diagram illustrating a system 700 in which an embodiment of the disclosure may be used. As shown in FIG. 7, multiprocessor system 700 is a point-to-point interconnect system, and includes a first processor 770 and a second processor 780 coupled via a point-to-point interconnect 750. While shown with only two processors 770, 780, it is to be understood that the scope of embodiments of the disclosure is not so limited. In other embodiments, one or more additional processors may be present in a given processor. In one embodiment, the multiprocessor system 700 may implement hybrid cores as described herein.

Processors 770 and 780 are shown including integrated memory controller units 772 and 782, respectively. Processor 770 also includes as part of its bus controller units point-to-point (P-P) interfaces 776 and 778; similarly, second processor 780 includes P-P interfaces 786 and 788. Processors 770, 780 may exchange information via a point-to-point (P-P) interface 750 using P-P interface circuits 778, 788. As shown in FIG. 7, IMCs 772 and 782 couple the processors to respective memories, namely a memory 732 and a memory 734, which may be portions of main memory locally attached to the respective processors.

Processors 770, 780 may each exchange information with a chipset 790 via individual P-P interfaces 752, 754 using point to point interface circuits 776, 794, 786, 798. Chipset 790 may also exchange information with a high-performance graphics circuit 738 via a high-performance graphics interface 739.

A shared cache (not shown) may be included in either processor or outside of both processors, yet connected with the processors via P-P interconnect, such that either or both processors' local cache information may be stored in the shared cache if a processor is placed into a low power mode.

Chipset 790 may be coupled to a first bus 716 via an interface 796. In one embodiment, first bus 716 may be a Peripheral Component Interconnect (PCI) bus, or a bus such as a PCI Express bus or another third generation I/O interconnect bus, although the scope of the present disclosure is not so limited.

As shown in FIG. 7, various I/O devices 714 may be coupled to first bus 716, along with a bus bridge 718 which couples first bus 716 to a second bus 720. In one embodiment, second bus 720 may be a low pin count (LPC) bus. Various devices may be coupled to second bus 720 including, for example, a keyboard and/or mouse 722, communication devices 727 and a storage unit 728 such as a disk drive or other mass storage device which may include instructions/code and data 730, in one embodiment. Further, an audio I/O 724 may be coupled to second bus 720. Note that other architectures are possible. For example, instead of the point-to-point architecture of FIG. 7, a system may implement a multi-drop bus or other such architecture.

Figure 8:
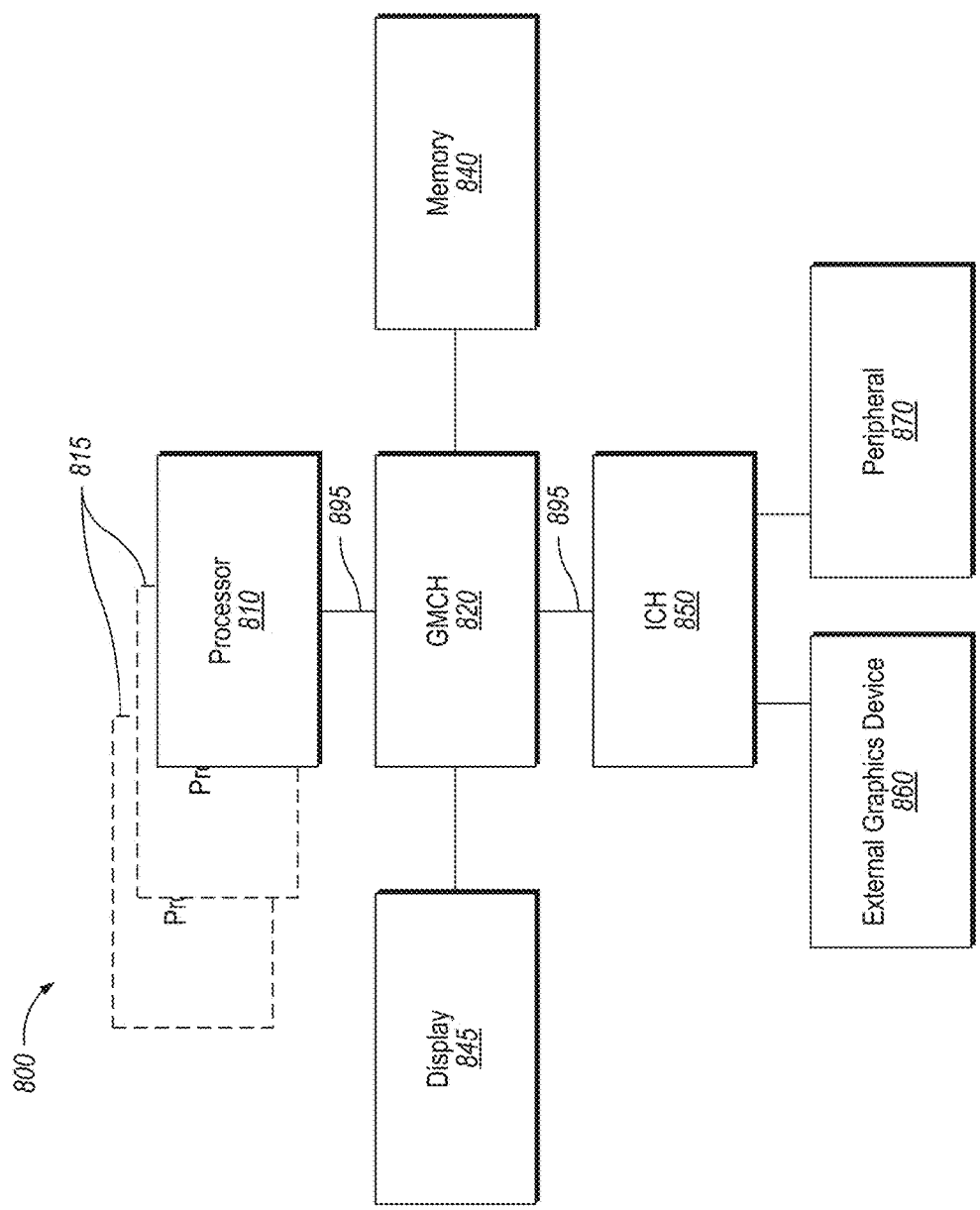
FIG. 8 is a block diagram of a system in which an embodiment of the disclosure may operate.

Referring now to FIG. 8, shown is a block diagram of a system 800 in which one embodiment of the disclosure may operate. The system 800 may include one or more processors 810, 815, which are coupled to graphics memory controller hub (GMCH) 820. The optional nature of additional processors 815 is denoted in FIG. 8 with broken lines. In one embodiment, processors 810, 815 implement hybrid cores according to embodiments of the disclosure.

Each processor 810, 815 may be some version of the circuit, integrated circuit, processor, and/or silicon integrated circuit as described above. However, it should be noted that it is unlikely that integrated graphics logic and integrated memory control units would exist in the processors 810, 815. FIG. 8 illustrates that the GMCH 820 may be coupled to a memory 840 that may be, for example, a dynamic random access memory (DRAM). The DRAM may, for at least one embodiment, be associated with a non-volatile cache.

The GMCH 820 may be a chipset, or a portion of a chipset. The GMCH 820 may communicate with the processor(s) 810, 815 and control interaction between the processor(s) 810, 815 and memory 840. The GMCH 820 may also act as an accelerated bus interface between the processor(s) 810, 815 and other elements of the system 800. For at least one embodiment, the GMCH 820 communicates with the processor(s) 810, 815 via a multi-drop bus, such as a frontside bus (FSB) 895.

Furthermore, GMCH 820 is coupled to a display 845 (such as a flat panel or touchscreen display). GMCH 820 may include an integrated graphics accelerator. GMCH 820 is further coupled to an input/output (I/O) controller hub (ICH) 850, which may be used to couple various peripheral devices to system 800. Shown for example in the embodiment of FIG. 8 is an external graphics device 860, which may be a discrete graphics device, coupled to ICH 850, along with another peripheral device 870.

Alternatively, additional or different processors may also be present in the system 800. For example, additional processor(s) 815 may include additional processors(s) that are the same as processor 810, additional processor(s) that are heterogeneous or asymmetric to processor 810, accelerators (such as, e.g., graphics accelerators or digital signal processing (DSP) units), field programmable gate arrays, or any other processor. There can be a variety of differences between the processor(s) 810, 815 in terms of a spectrum of metrics of merit including architectural, micro-architectural, thermal, power consumption characteristics, and the like. These differences may effectively manifest themselves as asymmetry and heterogeneity amongst the processors 810, 815. For at least one embodiment, the various processors 810, 815 may reside in the same die package.

Figure 9:
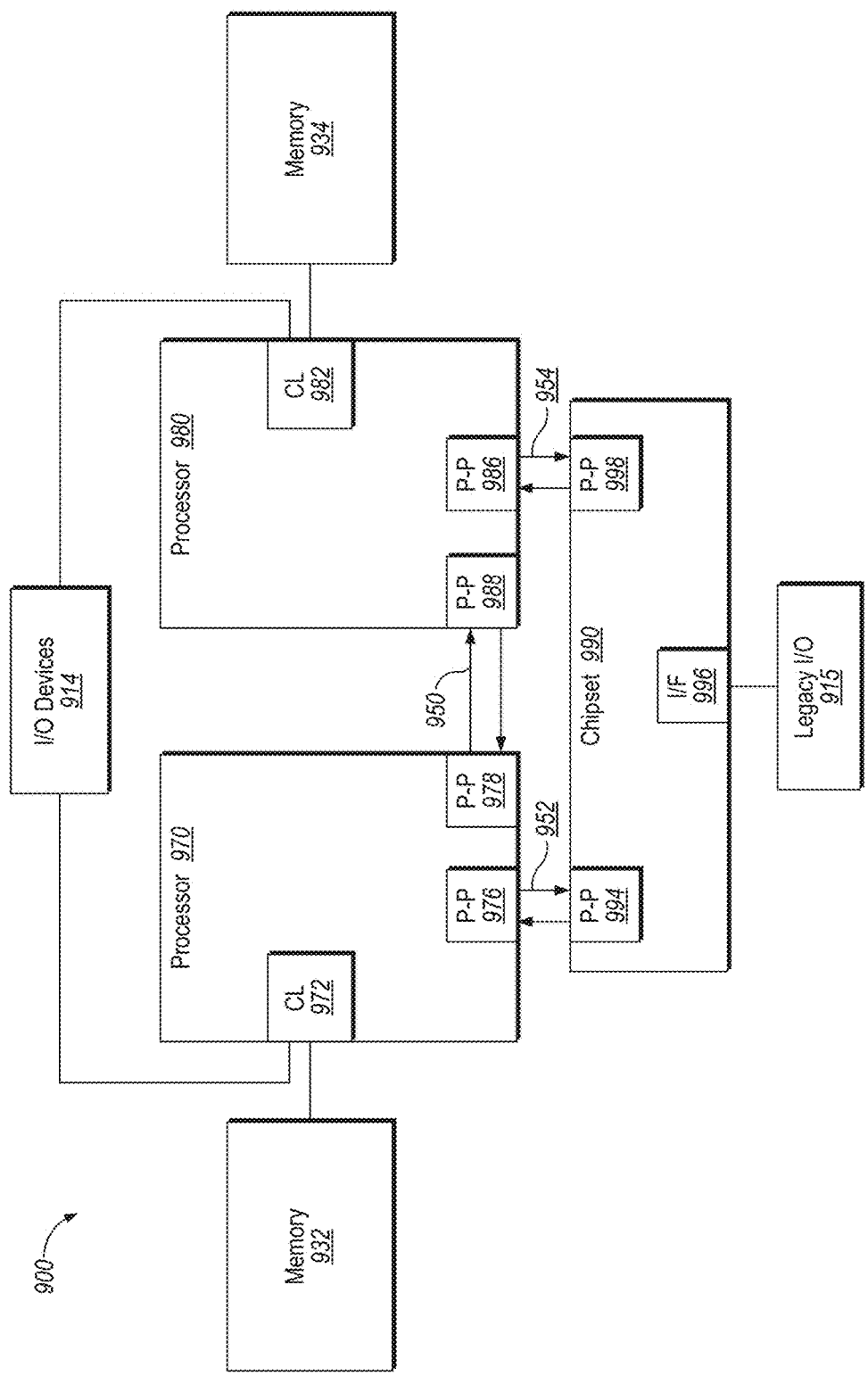
FIG. 9 is a block diagram of a system in which an embodiment of the disclosure may operate.

Referring now to FIG. 9, shown is a block diagram of a system 900 in which an embodiment of the disclosure may operate. FIG. 9 illustrates processors 970, 980. In one embodiment, processors 970, 980 may implement hybrid cores as described above. Processors 970, 980 may include integrated memory and I/O control logic ("CL") 972 and 982, respectively and intercommunicate with each other via point-to-point interconnect 950 between point-to-point (P-P) interfaces 978 and 988 respectively. Processors 970, 980 each communicate with chipset 990 via point-to-point interconnects 952 and 954 through the respective P-P interfaces 976 to 994 and 986 to 998 as shown. For at least one embodiment, the CL 972, 982 may include integrated memory controller units. CLs 972, 982 may include I/O control logic. As depicted, memories 932, 934 coupled to CLs 972, 982 and I/O devices 914 are also coupled to the control logic 972, 982. Legacy I/O devices 915 are coupled to the chipset 990 via interface 996.

Figure 10:
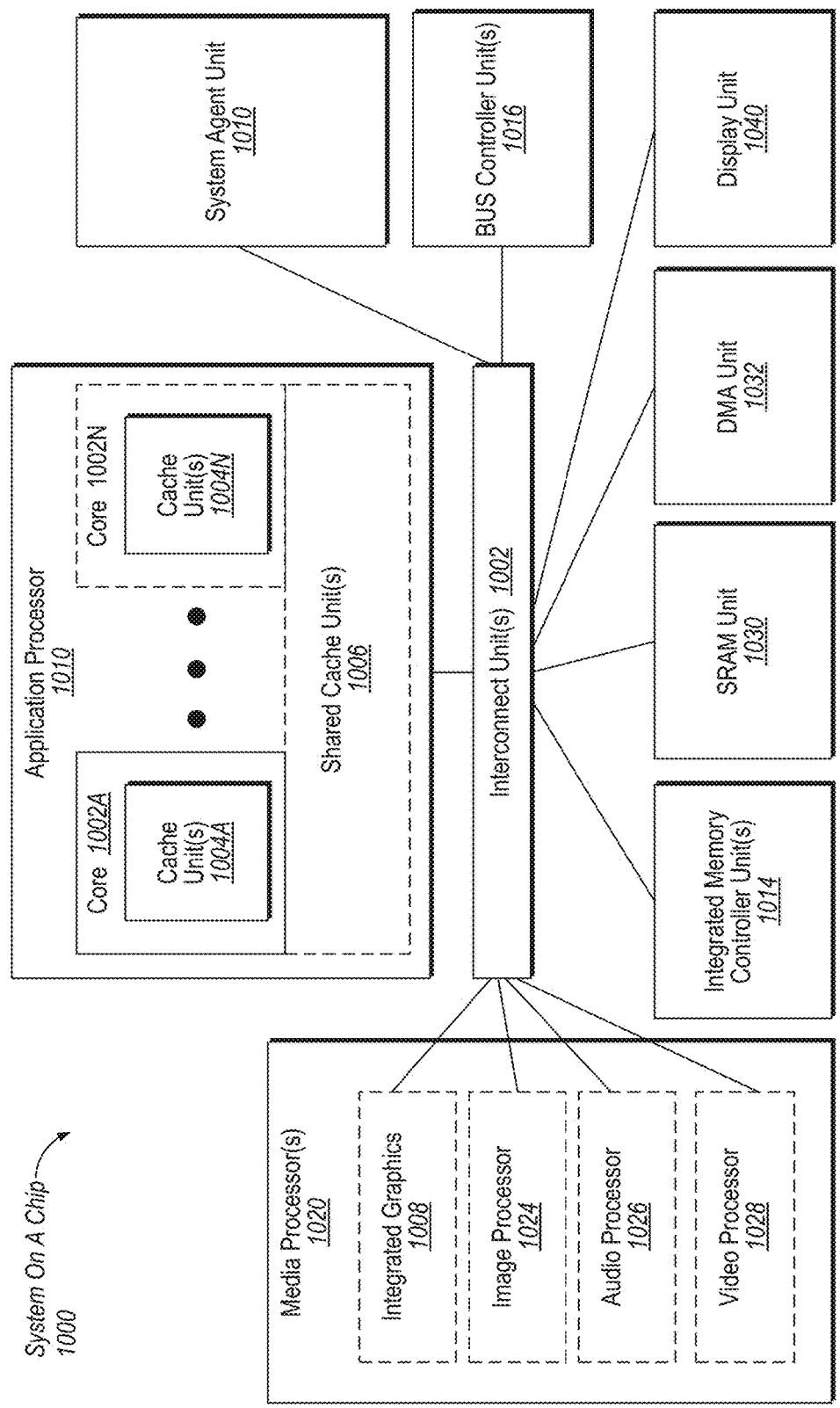
FIG. 10 is a block diagram of a System-on-a-Chip (SoC) in accordance with an embodiment of the present disclosure

Embodiments may be implemented in many different system types. FIG. 10 is a block diagram of a SoC 1000 in accordance with an embodiment of the present disclosure. Dashed lined boxes are optional features on more advanced SoCs. In FIG. 10, an interconnect unit(s) 1012 is coupled to: an application processor 1020 which includes a set of one or more cores 1002A-N and shared cache unit(s) 1006; a system agent unit 1010; a bus controller unit(s) 1016; an integrated memory controller unit(s) 1014; a set or one or more media processors 1018 which may include integrated graphics logic 1008, an image processor 1024 for providing still and/or video camera functionality, an audio processor 1026 for providing hardware audio acceleration, and a video processor 1028 for providing video encode/decode acceleration; an static random access memory (SRAM) unit 1030; a direct memory access (DMA) unit 1032; and a display unit 1040 for coupling to one or more external displays. In one embodiment, a memory module may be included in the integrated memory controller unit(s) 1014. In another embodiment, the memory module may be included in one or more other components of the SoC 1000 that may be used to access and/or control a memory. The application processor 1020 may include a store address predictor for implementing hybrid cores as described in embodiments herein.

The memory hierarchy includes one or more levels of cache within the cores, a set or one or more shared cache units 1006, and external memory (not shown) coupled to the set of integrated memory controller units 1014. The set of shared cache units 1006 may include one or more mid-level caches, such as level 2 (L2), level 3 (L3), level 4 (L4), or other levels of cache, a last level cache (LLC), and/or combinations thereof.

In some embodiments, one or more of the cores 1002A-N are capable of multi-threading. The system agent 1010 includes those components coordinating and operating cores 1002A-N. The system agent unit 1010 may include for example a power control unit (PCU) and a display unit. The PCU may be or include logic and components needed for regulating the power state of the cores 1002A-N and the integrated graphics logic 1008. The display unit is for driving one or more externally connected displays.

The cores 1002A-N may be homogenous or heterogeneous in terms of architecture and/or instruction set. For example, some of the cores 1002A-N may be in order while others are out-of-order. As another example, two or more of the cores 1002A-N may be capable of execution the same instruction set, while others may be capable of executing only a subset of that instruction set or a different instruction set.

The application processor 1020 may be a general-purpose processor, such as a Core™ i3, i5, i7, 2 Duo and Quad, Xeon™, Itanium™, Atom™ or Quark™ processor, which are available from Intel™ Corporation, of Santa Clara, Calif. Alternatively, the application processor 1020 may be from another company, such as ARM Holdings™, Ltd, MIPS™, etc. The application processor 1020 may be a special-purpose processor, such as, for example, a network or communication processor, compression engine, graphics processor, co-processor, embedded processor, or the like. The application processor 1020 may be implemented on one or more chips. The application processor 1020 may be a part of and/or may be implemented on one or more substrates using any of a number of process technologies, such as, for example, BiCMOS, CMOS, or NMOS.

Figure 11:
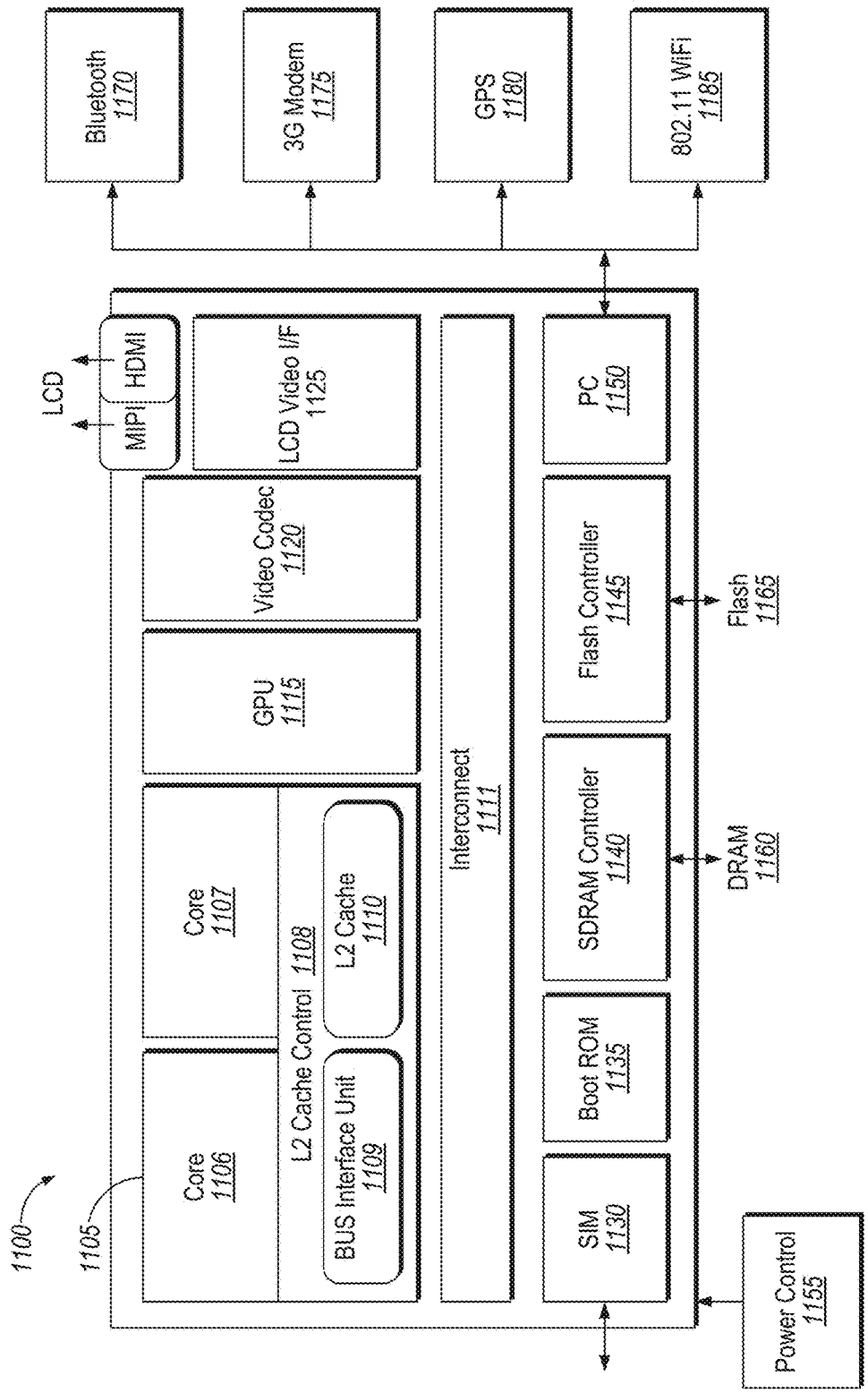
FIG. 11 is a block diagram of an embodiment of an SoC design in accordance with the present disclosure.

FIG. 11 is a block diagram of an embodiment of a system on-chip (SoC) design in accordance with the present disclosure. As a specific illustrative example, SoC 1100 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SOC 1100 includes 2 cores—1106 and 1107. Cores 1106 and 1107 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 1106 and 1107 are coupled to cache control 1108 that is associated with bus interface unit 1109 and L2 cache 1110 to communicate with other parts of system 1100. Interconnect 1110 includes an on-chip interconnect, such as an IOSF, AMBA, or other interconnect discussed above, which potentially implements one or more aspects of the described disclosure. In one embodiment, cores 1106, 1107 may implement hybrid cores as described in embodiments herein.

Interconnect 1110 provides communication channels to the other components, such as a Subscriber Identity Module (SIM) 1130 to interface with a SIM card, a boot ROM 1135 to hold boot code for execution by cores 1106 and 1107 to initialize and boot SoC 1100, a SDRAM controller 1140 to interface with external memory (e.g. DRAM 1160), a flash controller 1145 to interface with non-volatile memory (e.g. Flash 1165), a peripheral control 1150 (e.g. Serial Peripheral Interface) to interface with peripherals, video codecs 1120 and Video interface 1125 to display and receive input (e.g. touch enabled input), GPU 1115 to perform graphics related computations, etc. Any of these interfaces may incorporate aspects of the disclosure described herein. In addition, the system 1100 illustrates peripherals for communication, such as a Bluetooth module 1170, 3G modem 1175, GPS 1180, and Wi-Fi 1185.

Figure 12:
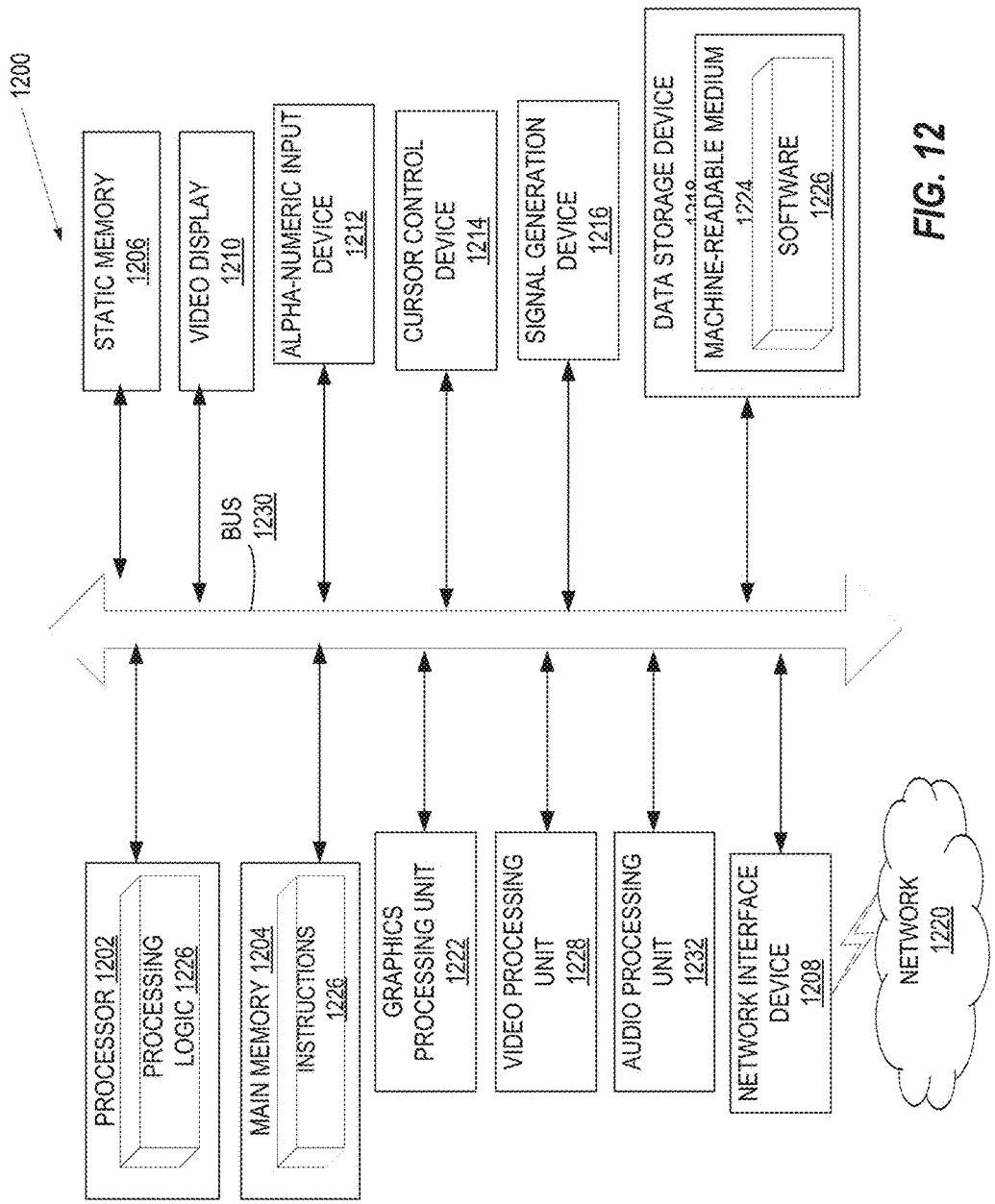
FIG. 12 illustrates a block diagram of one embodiment of a computer system.

FIG. 12 illustrates a diagrammatic representation of a machine in the example form of a computer system 1200 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 1200 includes a processing device 1202, a main memory 1204 (e.g., read-only memory (ROM), flash memory, dynamic random access memory (DRAM) (such as synchronous DRAM (SDRAM) or DRAM (RDRAM), etc.), a static memory 1206 (e.g., flash memory, static random access memory (SRAM), etc.), and a data storage device 1218, which communicate with each other via a bus 1230.

Processing device 1202 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1202 may also be one or more special-purpose processing devices such as an application specific integrated circuit (ASIC), a field programmable gate array (FPGA), a digital signal processor (DSP), network processor, or the like. In one embodiment, processing device 1202 may include one or processing cores. The processing device 1202 is configured to execute the processing logic 1226 for performing the operations and steps discussed herein. In one embodiment, processing device 1202 is the same as processor architecture 100 described with respect to FIG. 1 as described herein with embodiments of the disclosure.

The computer system 1200 may further include a network interface device 1208 communicably coupled to a network 1220. The computer system 1200 also may include a video display unit 1210 (e.g., a liquid crystal display (LCD) or a cathode ray tube (CRT)), an alphanumeric input device 1212 (e.g., a keyboard), a cursor control device 1214 (e.g., a mouse), and a signal generation device 1216 (e.g., a speaker). Furthermore, computer system 1200 may include a graphics processing unit 1222, a video processing unit 1228, and an audio processing unit 1232.

The data storage device 1218 may include a machine-accessible storage medium 1224 on which is stored software 1226 implementing any one or more of the methodologies of functions described herein, such as implementing store address prediction for memory disambiguation as described above. The software 1226 may also reside, completely or at least partially, within the main memory 1204 as instructions 1226 and/or within the processing device 1202 as processing logic 1226 during execution thereof by the computer system 1200; the main memory 1204 and the processing device 1202 also constituting machine-accessible storage media.

The machine-readable storage medium 1224 may also be used to store instructions 1226 implementing store address prediction for hybrid cores such as described according to embodiments of the disclosure. While the machine-accessible storage medium 1128 is shown in an example embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present disclosure. The term "machine-accessible storage medium" shall accordingly be taken to include, but not be limited to, solid-state memories, and optical and magnetic media.

The following examples pertain to further embodiments.

Example 1 is a processor comprising a processing core to generate a memory request for application data in an application and a virtual page group memory management (VPGMM) unit, coupled to the processing core to specify a caching priority (CP) to the application data for the application.

In Example 2, the subject matter of Example 1 can optionally include wherein the VPGMM unit to assign pages in a virtual address of the application to create a virtual page group (VPG).

In Example 3, the subject matter of any one of Examples 1-2 can optionally include wherein the VPGMM unit to assign a default value to the CP associated with the VPG.

In Example 4, the subject matter of any one of Examples 1-3 can optionally include wherein the VPGMM unit to modify the default value of the CP associated with the VPG.

In Example 5, the subject matter of any one of Examples 1-4 can optionally include wherein the VPGMM unit to modify the default value of the CP associated with the VPG in view of type of the application data.

In Example 6, the subject matter of any one of Examples 1-5 can optionally include wherein the VPGMM unit to modify the default value of the CP associated with the VPG in view of at least one requirement of the application.

In Example 7, the subject matter of any one of Examples 1-6 can optionally include wherein the modified default value of the CP is applied for the memory request for the application data in the cache.

Example 8 is a system-on-a chip (SoC) comprising a memory and a processor, communicatively coupled to the memory, comprising a processing core to generate a memory request for an application data in an application; and a virtual page group memory management (VPGMM) unit, coupled to the processing core to specify a caching priority (CP) to the application data for the application.

In Example 9, the subject matter of Example 8 can optionally include wherein the VPGMM unit to assign pages in a virtual address of the application to create a virtual page group (VPG).

In Example 10, the subject matter of any one of Examples 8-9 can optionally include wherein the VPGMM unit to modify a value of the CP associated with the VPG.

Example 11 is a method comprising receiving a memory request for an application data in an application; and specifying a caching priority (CP) to the application data for the application, wherein the caching priority identifies importance of the application data in a cache.

In Example 12, the subject matter of Example 11 can optionally include assigning pages in a virtual address of the application to create a virtual page group (VPG).

In Example 13, the subject matter of any one of Examples 11-12 can optionally include assigning a default value to the CP associated with the VPG.

In Example 14, the subject matter of any one of Examples 11-13 can optionally include modifying the default value of the CP associated with the VPG in view of type of the application data.

In Example 15, the subject matter of any one of Examples 11-14 can optionally include modifying the default value of the CP associated with the VPG in view of at least one requirement of the application.

Example 16 is a non-transitory machine-readable storage medium including data that, when accessed by a processing device, cause the processing device to perform operations comprising receiving a memory request for an application data in an application; and specifying a caching priority (CP) to the application data for the application.

In Example 17, the subject matter of Example 16 can optionally include wherein the operations further comprising assigning pages in a virtual address of the application to create a virtual page group (VPG).

In Example 18, the subject matter of any one of Examples 16-17 can optionally include wherein the operations further comprising assigning a default value to the CP associated with the VPG.

In Example 19, the subject matter of any one of Examples 16-18 can optionally include wherein the operations further comprising modifying the default value of the CP associated with the VPG in view of type of the application data.

In Example 20, the subject matter of any one of Examples 16-19 can optionally include wherein the operations further comprising modifying the default value of the CP associated with the VPG in view of at least one requirement of the application.

While the disclosure has been described with respect to a limited number of embodiments, those skilled in the art will appreciate numerous modifications and variations there from. It is intended that the appended claims cover all such modifications and variations as fall within the true spirit and scope of this disclosure.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 910 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. A processor comprising:
 a processing core to generate a memory request for application data in an application, the application data comprising a first virtual address page; and
 a virtual page group memory management (VPGMM) unit, coupled to the processing core;
 wherein the VPGMM unit includes a page table comprising a plurality of page table entries (PTEs), each PTE corresponding to a different one of a plurality of virtual address pages including the first virtual address page;
 wherein the VPGMM unit enables the application to assign one or more of the virtual address pages including the first virtual address page to a virtual page group (VPG) denoted by a VPG identification (VPGID);

wherein the VPGMM unit includes a caching priority (CP) table, the CP table being indexed by the VPGID such that a CP value in an entry of the CP table indexed by the VPGID indicates a relative caching priority of the virtual address pages comprising the VPG; and wherein changing the CP value changes the relative caching priority of the virtual address pages comprising the VPG.

2. The processor of claim 1, wherein the VPGMM unit to assign a default value to the CP associated with the VPG.

3. The processor of claim 2 wherein the VPGMM unit to modify the default value of the CP associated with the VPG.

4. The processor of claim 3, wherein the VPGMM unit to modify the default value of the CP associated with the VPG in view of type of the application data.

5. The processor of claim 3, wherein the VPGMM unit to modify the default value of the CP associated with the VPG in view of at least one requirement of the application.

6. The processor of claim 3, wherein the modified default value of the CP is applied for the memory request for the application data in the application.

7. A system-on-a chip (SoC) comprising:
a memory; and
a processor, communicably coupled to the memory, comprising:
a processing core to generate a memory request for application data in an application, the application data comprising a first virtual address page; and
a virtual page group memory management (VPGMM) unit, coupled to the processing core;
wherein the VPGMM unit includes a page table comprising a plurality of page table entries (PTEs), each PTE corresponding to a different one of a plurality of virtual address pages including the first virtual address page;
wherein the VPGMM unit enables the application to assign one or more of the virtual address pages including the first virtual address page to a virtual page group (VPG) denoted by a VPG identification (VPGID);
wherein the VPGMM unit includes a caching priority (CP) table, the CP table being indexed by the VPGID such that a CP value in an entry of the CP table indexed by the VPGID indicates a relative caching priority of the virtual address pages comprising the VPG; and
wherein changing the CP value changes the relative caching priority of the virtual address pages comprising the VPG.

8. The SoC of claim 7 wherein the VPGMM unit to modify a value of the CP associated with the VPG.

9. A method comprising:
receiving a memory request for an application data in an application, the application data comprising a first virtual address page; and
specifying by a virtual page group memory management (VPGMM) unit a caching priority (CP) to the application data for the application, wherein the caching priority identifies importance of the application data in a cache;
wherein the VPGMM unit includes a page table comprising a plurality of page table entries (PTEs), each PTE corresponding to a different one of a plurality of virtual address pages including the first virtual address page;
wherein the VPGMM unit enables the application to assign one or more of the virtual address pages including the first virtual address page to a virtual page group (VPG) denoted by a VPG identification (VPGID);
wherein the VPGMM unit includes a caching priority (CP) table, the CP table being indexed by the VPGID such that a CP value in an entry of the CP table indexed by the VPGID indicates a relative caching priority of the virtual address pages comprising the VPG; and
wherein changing the CP value changes the relative caching priority of the virtual address pages comprising the VPG.

10. The method of claim 9 further comprising assigning a default value to the CP associated with the VPG.

11. The method of claim 10 further comprising modifying the default value of the CP associated with the VPG in view of type of the application data.

12. The method of claim 10 further comprising modifying the default value of the CP associated with the VPG in view of at least one requirement of the application.

13. A non-transitory machine-readable storage medium including instructions that, when accessed by a processing device, cause the processing device to perform operations comprising:
receiving a memory request for an application data in an application, the application data comprising a first virtual address page; and
specifying by a virtual page group memory management (VPGMM) unit a caching priority (CP) to the application data for the application, wherein the caching priority identifies importance of the application data in a cache;
wherein the VPGMM unit includes a page table comprising a plurality of page table entries (PTEs), each PTE corresponding to a different one of a plurality of virtual address pages including the first virtual address page;
wherein the VPGMM unit enables the application to assign one or more of the virtual address pages including the first virtual address page to a virtual page group (VPG) denoted by a VPG identification (VPGID);
wherein the VPGMM unit includes a caching priority (CP) table, the CP table being indexed by the VPGID such that a CP value in an entry of the CP table indexed by the VPGID indicates a relative caching priority of the virtual address pages comprising the VPG; and
wherein changing the CP value changes the relative caching priority of the virtual address pages comprising the VPG.

14. The non-transitory machine-readable storage medium of claim 13, wherein the operations further comprising assigning a default value to the CP associated with the VPG.

15. The non-transitory machine-readable storage medium of claim 14, wherein the operations further comprising modifying the default value of the CP associated with the VPG in view of type of the application data.

16. The non-transitory machine-readable storage medium of claim 14, wherein the operations further comprising modifying the default value of the CP associated with the VPG in view of at least one requirement of the application.

* * * * *